United States Patent
Zemmouri

(10) Patent No.: US 8,011,800 B2
(45) Date of Patent: Sep. 6, 2011

(54) DEVICE FOR PRODUCING ISOTROPIC AMBIENT LIGHT

(75) Inventor: Jaouad Zemmouri, Genech (FR)

(73) Assignees: Regenerer, Tourcoing (FR); Optical System & Research for Industry and Science Osyris, Hellemmes (FR)

( * ) Notice: Subject to any disclaimer, the term of this patent is extended or adjusted under 35 U.S.C. 154(b) by 450 days.

(21) Appl. No.: 12/225,406

(22) PCT Filed: Mar. 20, 2007

(86) PCT No.: PCT/FR2007/000473
§ 371 (c)(1),
(2), (4) Date: Dec. 10, 2008

(87) PCT Pub. No.: WO2007/107650
PCT Pub. Date: Sep. 27, 2007

(65) Prior Publication Data
US 2009/0154154 A1 Jun. 18, 2009

(30) Foreign Application Priority Data

Mar. 21, 2006 (FR) .................................... 06 02447
Mar. 21, 2006 (FR) .................................... 06 02448

(51) Int. Cl.
*F21V 9/00* (2006.01)
*F21V 7/04* (2006.01)

(52) U.S. Cl. ................... 362/231; 362/235; 362/249.02; 362/346

(58) Field of Classification Search ................. 362/97.1, 362/97.2, 97.3, 249.02, 231, 235, 552, 297, 362/298, 301, 346; 385/129, 901, 4, 5; 356/121, 356/432
See application file for complete search history.

(56) References Cited

U.S. PATENT DOCUMENTS 6,318,863 B1   11/2001  Tiao et al.
6,568,832 B1 *  5/2003  Pillai et al. .................... 362/231
(Continued)

FOREIGN PATENT DOCUMENTS
EP   1267118 A   12/2002
(Continued)

OTHER PUBLICATIONS

English translation of International Preliminary Report on Patentability for PCT/FR2007/000473, Dec. 3, 2008, whole document.*
Lumileds Lighting US et al: "For LCD Backlighting Luxeon DCC" Lumileds Application Brief AB27, Jan. 2005, XP002407225, pp. 1-38.

*Primary Examiner* — Thomas M Sember
(74) *Attorney, Agent, or Firm* — Harness, Dickey & Pierce, P.L.C.

(57) ABSTRACT

The invention concerns a device for producing isotropic ambient light, comprising: at least one extended light source including several punctual light sources spaced apart along two orthogonal axes; a waveguide for propagating by total reflections in a propagating direction perpendicular to the plane, the light beams produced by the punctual light sources; and means for scattering the light in the waveguide output. The dimension of the waveguide along said propagating direction is further sufficient to allow the light intensity curve which is detected, for each light source, in the waveguide output along one of the two axes and in a detecting range corresponding to the waveguide output section along said axis, to have a maximum value (Imax) and a minimum value (Imin) which satisfy the following criterion of quasi-uniformity (Imax-Imoy) $\leq$ 0.3Imoy and (Imoy-Imin) $\leq$ 0.3Imoy, Imoy being the average value of the light intensity levels detected along said axis.

15 Claims, 8 Drawing Sheets

U.S. PATENT DOCUMENTS

| | | |
|---|---|---|
| 2003/0156238 A1* | 8/2003 | Hiraishi et al. ............... 349/112 |
| 2005/0007346 A1 | 1/2005 | Ma et al. |
| 2005/0254771 A1 | 11/2005 | Yamashita et al. |
| 2008/0137004 A1* | 6/2008 | Iwasaki et al. ................ 349/64 |

FOREIGN PATENT DOCUMENTS

| | | |
|---|---|---|
| EP | 1306697 A1 | 5/2003 |
| EP | 1418765 A | 5/2004 |
| JP | 2002-133932 A | 5/2002 |

* cited by examiner

DEVICE FOR PRODUCING ISOTROPIC AMBIENT LIGHT

CROSS-REFERENCE TO RELATED APPLICATIONS

This application is a 371 U.S. National Stage of International Application No. PCT/FR2007/000473, filed Mar. 20, 2007. This application claims priority to French Patent Applications FR 06/02447, filed Mar. 21, 2006, and FR 06/02448, filed Mar. 21, 2006. The disclosures of the above applications are expressly incorporated herein by reference.

FIELD OF THE INVENTION

The present invention relates to a new device for producing isotropic ambient light, including at least one extended light source made up of several punctual light sources.

PRIOR ART

To produce a coloured light of which the colour is adjustable, it is known to use several light sources of different colours of which the intensities are adjustable, in combination with optical means for mixing the light waves produced. Devices for producing coloured light of this type are for instance described in U.S. Pat. No. 6,568,832 and in French patent application FR 2 830 315.

In U.S. Pat. No. 6,568,832, a solid body is used for mixing the light waves, including a light entrance surface and a light exit surface and, between the two light entrance and exit surfaces, an internal cavity filled with air and perpendicular to the alignment of the entrance and exit surfaces. This body enables the light waves to be mixed by submitting them to multiple internal reflections on the external surface of the internal cavity. According to a first improvement described in this publication, the mixing of the light waves can be improved by treating in particular the exit surface in order to make it rough. According to a second improvement described in this publication, the mixing of the light waves can be improved by inserting elements with reflecting discontinuities (bubbles, metal particles) into the solid body, in order to increase the number of internal reflections.

A major disadvantage of this type of device lies in its very weak light output resulting from the multiplicity of internal reflections of the light waves to obtain their mix. To increase the light output, one can endeavour to reduce the number of internal reflections, but in this case the mixing of the waves is weakened in a detrimental manner; the result is a lack of uniformity in the colour space of the produced light.

In French patent application FR 2 830 315, the mixing of the light waves is obtained through scattering by means of a translucent plate (for instance a frosted scattering plate). The main disadvantage of this device lies in the bad quality of the mix of the light waves, which manifests itself by a significant spatial heterogeneity of the mix of the light waves. Thus, with this type of device, significant differences in colour in the produced light are noticed in the space.

OBJECT OF THE INVENTION

The present invention aims to suggest a new device for producing ambient light, which enables two advantages to be combined: a very good light output and a very good isotropy in the space of the produced light, i.e. a very good uniformity in each point of the space of both the light intensity and the colour of the light.

A further object of the invention is to suggest a device for producing isotropic ambient light that is compact and can be manufactured at a low cost.

SUMMARY OF THE INVENTION

The invention thus has as its object a device for producing isotropic ambient light including:
  at least one extended light source ($S_i$), which comprises several punctual light sources spaced apart along two orthogonal axes (X, Y),
  a wave guide, which enables light beams produced by the punctual light sources to be propagated, by total reflections and in a propagation direction (Z) perpendicular to the plane (X, Y),
  a means for scattering the light at the exit of the wave guide.

The dimension (L) of the wave guide along said propagation direction (Z) is also sufficient for the light intensity curve ($I_{i,x}$), which is detected for each light source ($S_i$) at the exit of the wave guide along one of the two axes (X or Y) and in a detection range corresponding to the section of the exit of the wave guide along this axis (X or Y), to display a maximum value (Imax) and a minimum value (Imin), which respect the following criterion of quasi-uniformity: (Imax−Imoy)≦0.3.Imoy and (Imoy−Imin)≦0.3.Imoy, Imoy being the average value of the light intensity levels ($I_{i,x}$) detected along this axis (X or Y).

The invention is thus based upon the new combination:
  of a mix in a wave guide of primary light beams produced by the punctual sources, so as to obtain at the exit of this wave guide a quasi-uniform light intensity along the entire section of the exit of the wave guide, and
  a scattering of the light at the exit of the wave guide, so as to lose all directivity of the punctual light sources.

A "wave guide" in the sense of the present document is defined in the usual manner in optics as any optical system in which a light wave is propagated by total reflections on the edges of the guide, in a given propagation direction.

A wave guide can normally consist of a tube with a transverse cross-section that is circular or polygonal (a rectangular or square cross-section, for instance) and preferably, but not necessarily, displays a central axis of symmetry. This guide can be solid (a solid parallelepiped, for instance); in this case, the propagation of the light in the guide by total successive reflections on the edges of the guide is linked to a step index between the constituent matter of the guide (propagation medium of the light) and the external medium surrounding the guide (for instance air or casing in a different material displaying an appropriate refractive index inferior to that of the propagation medium). This guide can be hollow and consist of walls, the internal surfaces of which are mirrors.

Compared with the above-cited U.S. Pat. No. 6,568,832 of the prior art, the solid cylindrical body with the central internal cavity that is used as the mixer does not constitute a wave guide in the sense of the present document. In effect, in this mixer, the light is not propagated by total successive reflections on the edges of this solid (external surface of the central cavity and external surface of the body).

More particularly, but not necessarily, the device according to the invention includes the following additional and optional characterising features, in isolation or, if applicable, in combination:
  the light intensity curve ($I_{i,x}$) that is detected for each light source ($S_i$) displays a maximum value (Imax) and a minimum value (Imin), which respect the following criterion of quasi-uniformity: (Imax−Imoy)≦0.25.Imoy and (Imoy−Imin)≦0.25.Imoy;

the scattering means displays a scattering angle complementary to the emission angle of the punctual light sources, such that the light at the exit of the scattering means is emitted over 180°;

the emission angle of the punctual light sources is superior or equal to 60°;

the global light output ρ' of the wave guide/scattering means ensemble is superior to 60% and preferably superior to 70%;

the light output (ρ) of the wave guide is superior to 70% and preferably superior to 80%;

the light intensity of at least one light source, and preferably of each light source ($S_i$), is adjustable;

the device includes at least two light sources ($S_i$), each displaying different ranges of emission wave lengths ($P_i$);

the device includes at least three light sources ($S_1, S_2, S_3$), each displaying different ranges of emission wave lengths, which can overlap or not;

the device includes three different light sources ($S_1, S_2, S_3$), a first light source ($S_1$) being designed to emit along a range of wave lengths comprised between 450 nm and 600 nm, a second light source ($S_2$) being designed to emit along a range of wave lengths comprised between 400 nm and 500 nm, and a third light source ($S_3$) being designed to emit along a range of wave lengths comprised between 600 nm and 700 nm;

each light source ($S_i$) includes a plurality of electroluminescent diodes;

the wave guide includes at least one solid full transparent body; more particularly, said solid body is made out of polymer or glass;

the wave guide includes walls, which are orientated parallel to the propagation direction (Z) of the guide, the internal surfaces of which are reflecting mirrors, and which define between them an internal cavity for propagating the light.

BRIEF DESCRIPTION OF DRAWINGS

Other characteristic features and advantages of the invention will appear more clearly upon reading the detailed description hereinafter of several preferred embodiments of the invention, the description of which is given by way of a non-limiting and non-exhaustive example of the invention, and with reference to the attached drawings in which.

DETAILED DESCRIPTION

1$^{st}$ Embodiment—Solid Wave Guide

Figure 1:
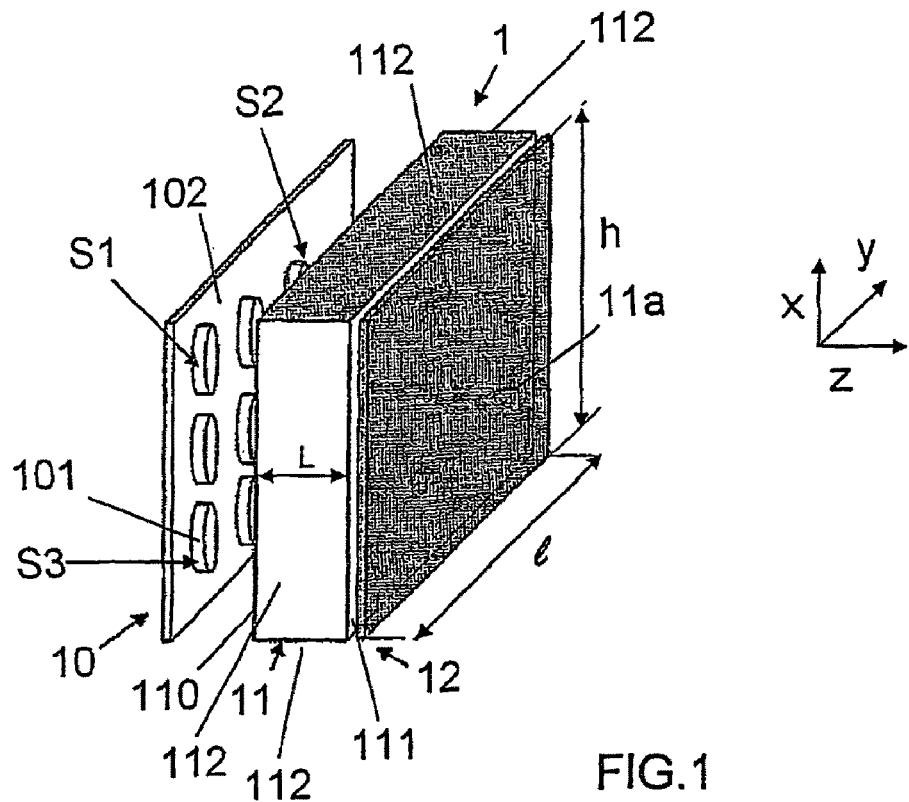
FIG. 1 shows a first embodiment of a device according to the invention.

FIG. 1 shows a first embodiment of a device 1 for producing coloured light according to the invention.

This device includes three modules:
a module 10 for producing light beams,
a wave guide 11 functioning as a mixer of the light beams produced by the module 10,
a scattering module 12.

Module 10 for Producing Light Beams

The module 10 includes an ensemble of several punctual light sources in the form of electroluminescent diodes 101 that are welded onto a plate 102, and at least one electrical supply (not shown), which is connected to the diodes 101 by means of an electrical circuit engraved on the plate, and which in a known manner enables the diodes 101 to be switched on.

Figure 2:
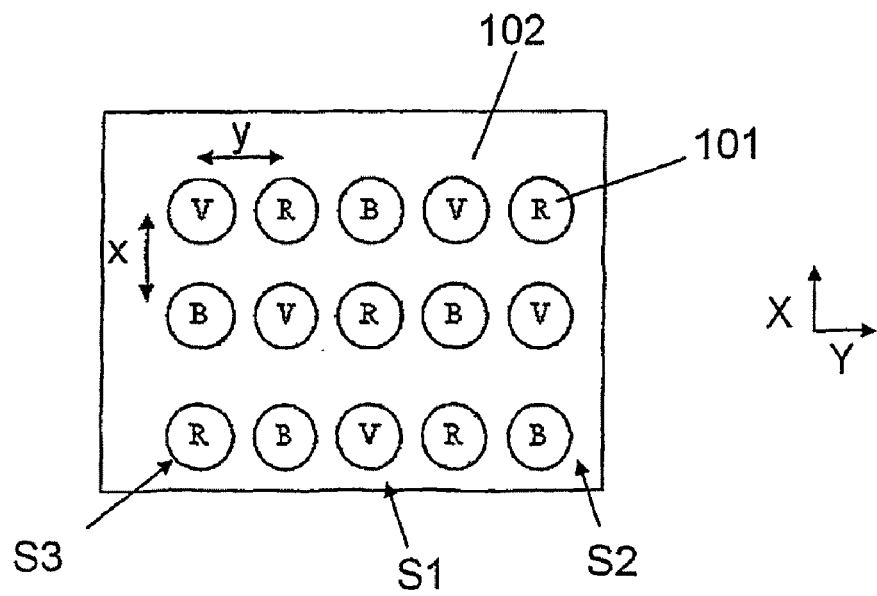
FIG. 2 shows a frontal view of the module for producing light beams of the device of FIG. 1, said frontal view enabling an example of spatial distribution of the light sources to be visualised.

The electroluminescent diodes 101 are distributed according to the configuration shown in FIG. 2. On this FIG. 2, the letters V identify diodes 101 of the colour green that form a first extended light source $S_1$ emitting along a range of wave lengths $P_1$ comprised for instance in the 450 nm-600 nm wave length range; the letters B identify diodes 101 of the colour blue that form a second extended light source $S_2$ emitting along a range of wave lengths $P_2$ comprised for instance in the 400 nm-500 nm wave length range; the letters R identify diodes 101 of the colour red that form a third extended light source $S_3$ emitting along a range of wave lengths $P_3$ comprised for instance in the 600 nm-700 nm wave length range.

The invention is not limited to a device including the above-cited three extended light sources $S_1, S_2$ and $S_3$, but can be implemented with any module 10 for producing light beams including at least one extended light source, which includes several punctual light sources spaced apart and distributed along two orthogonal axes (X, Y). The light sources ($S_1$) can be identical (identical emission wave lengths) or different (light sources emitting along different wave lengths). The emission wave length ranges of these sources can be different from the above-cited wave length ranges. The emission wave length ranges of these sources can overlap partially or be separate. The light sources ($S_i$) are not necessarily arranged in the same plane and are not necessarily constituted of electroluminescent diodes. The invention is also not limited to the particular configuration of diodes shown in FIG. 2.

Preferably, but not necessarily, the module 10 includes means for adjusting the emission intensity of at least one of the light sources ($S_1$ to $S_3$) and preferably means enabling an adjustment to be made separately of the emission intensity of each of the light sources ($S_1$ to $S_3$); these adjustment means enable the light intensity ratios between the sources ($S_1$ to $S_3$) to be modified and, by this means, the colour of the light produced at the exit of the device 1 of the invention to be regulated. Nevertheless, in a simplified embodiment of the invention, it may be that the light intensity ratios between the sources ($S_1$ to $S_3$) are also not able to be adjusted, with the result in this case that the colour of the light produced at the exit of the device 1 of the invention is not adjustable.

Wave Guide (11)

In the embodiment of FIG. 1, the wave guide 11 is a solid full body including a central axis of symmetry 11a and made of a transparent material. It can for instance be a solid made out of glass or plastic. In the particular illustrated example, this is a solid parallelepiped, including:

an entrance surface 110 of the light beams produced by the sources $S_1$ to $S_3$, which entrance surface 110 is situated in a plane perpendicular to the central axis of symmetry 11a of the guide 11, an exit surface 111 parallel to the entrance surface 110 and aligned with this entrance surface 110 along the central axis of symmetry 11a of the guide 11, four lateral surfaces 112 for guiding the light, which are parallel to the central axis of symmetry 11a.

In operating mode, the light beams produced by the light sources $S_1$ to $S_3$ penetrate the wave guide 11 through its entrance surface 110 and are propagated in the longitudinal propagation direction Z which is parallel to the central axis of symmetry 11a of the wave guide 11, while experiencing total reflections on the lateral guiding surfaces 112 of the wave guide 11.

Figure 3:
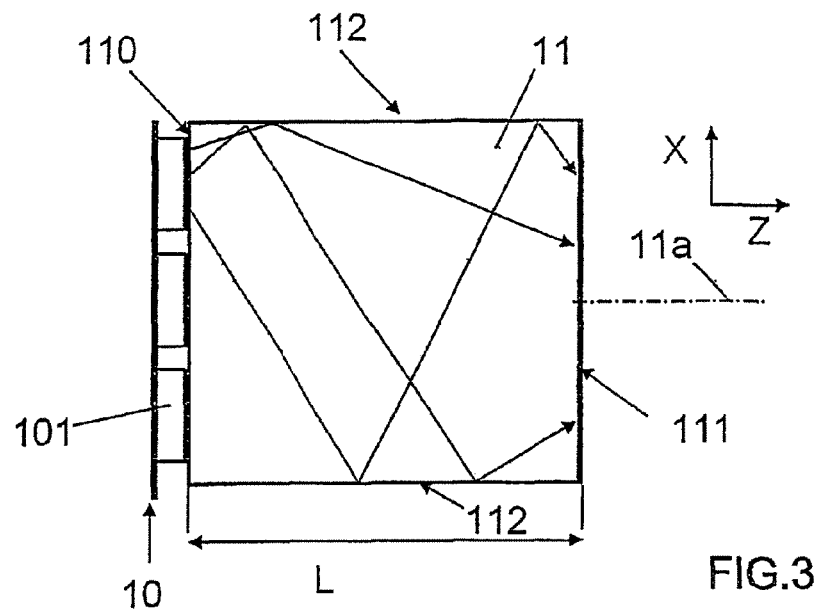
FIG. 3 shows a diagrammatic side view of the device of FIG. 1.

On FIG. 3, arrows symbolise examples of optical paths illustrating this light propagation in the guide 11 through total successive reflections. In this embodiment, these total reflections of the light waves inside the wave guide 11 are obtained thanks to the step index between the constituent matter of the wave guide 11 and the air surrounding the guide 11.

Given this propagation of the light waves inside the guide 11 in the direction Z with multiple total reflections, a mixing is advantageously obtained of the different light beams produced by the light sources $S_1$ to $S_3$ while nevertheless maintaining a very good output ρ between the light intensity $P_s$ at the exit of the guide 11 and the light intensity $P_e$ at the entrance of the guide 11 ($ρ=P_s/P_e$). This output ρ is close to 1 and depends on the imperfections in the structure of the constituent matter of the wave guide 11. In practice and preferably, the wave guide 11 will be chosen such that this output ρ is superior to 0.7 and preferably even superior to 0.8. The light intensities $P_s$ and $P_e$ for calculating the light output ρ can be measured in watts by means of a wattmeter or in lux by means of a luxometer.

The length L of the wave guide 11 (i.e. when referring to FIGS. 1 and 3, the distance L separating the two entrance 110 and exit 111 surfaces along the propagation direction Z) is fixed on a case-by-case basis according to the quality sought for the spatial homogeneity of the colour of the light produced at the exit of the device 1.

Embodiments

Figure 4:
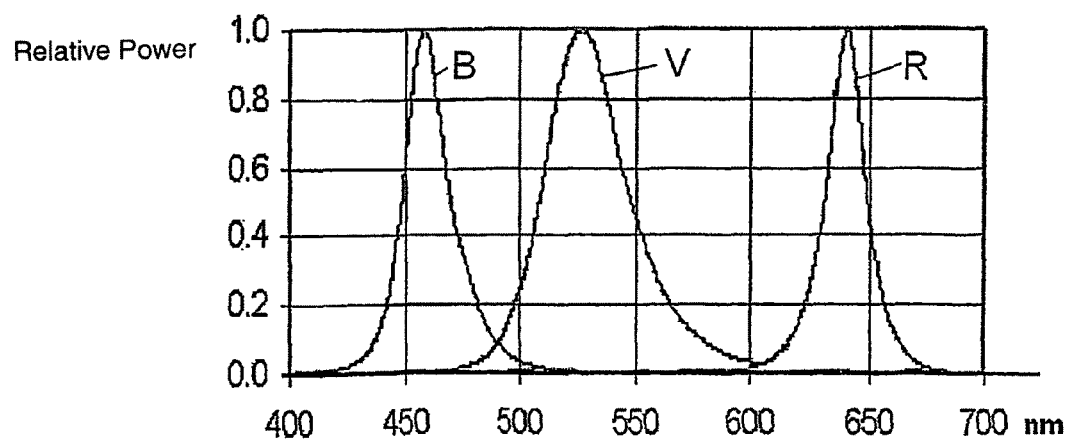
FIG. 4 shows an example of emission spectra of the light sources of the device of FIG. 1, FIGS. 5 to 14 show results of the measurement of light intensity levels detected at the exit of the wave guide of the device of FIG. 1, for different length values of this wave guide.
Figure 5:
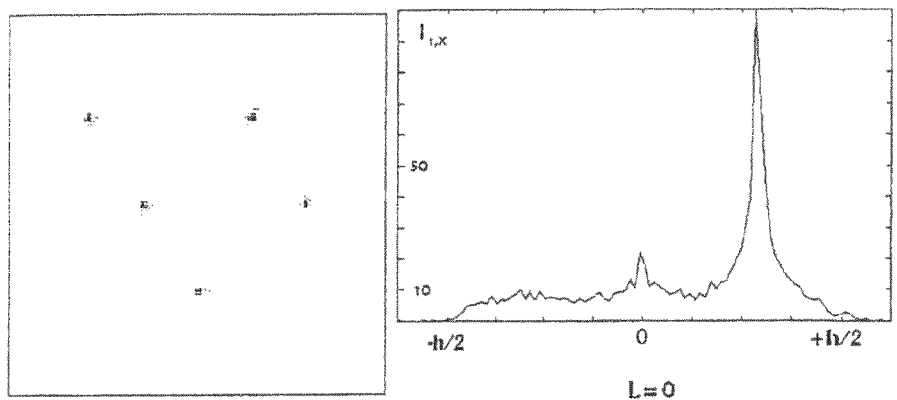
Figure 6:
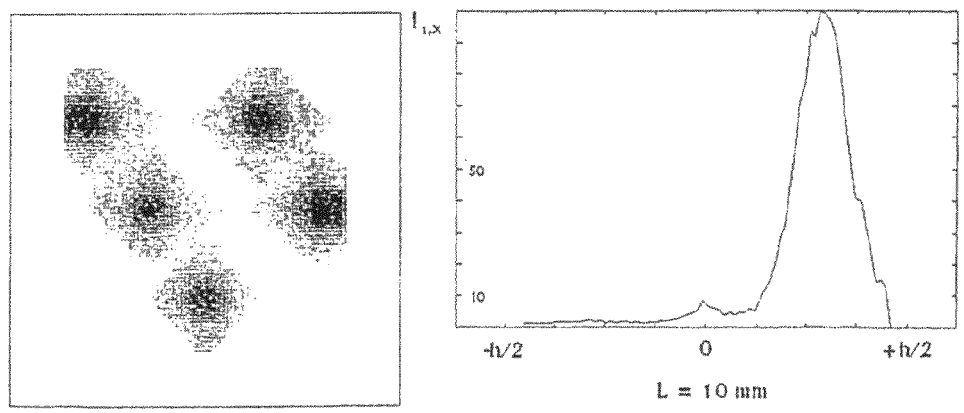
Figure 7:
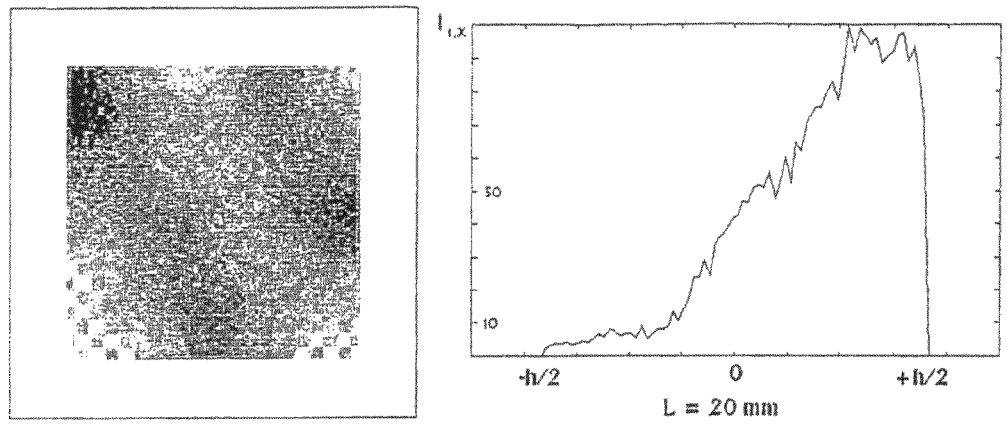
Figure 8:
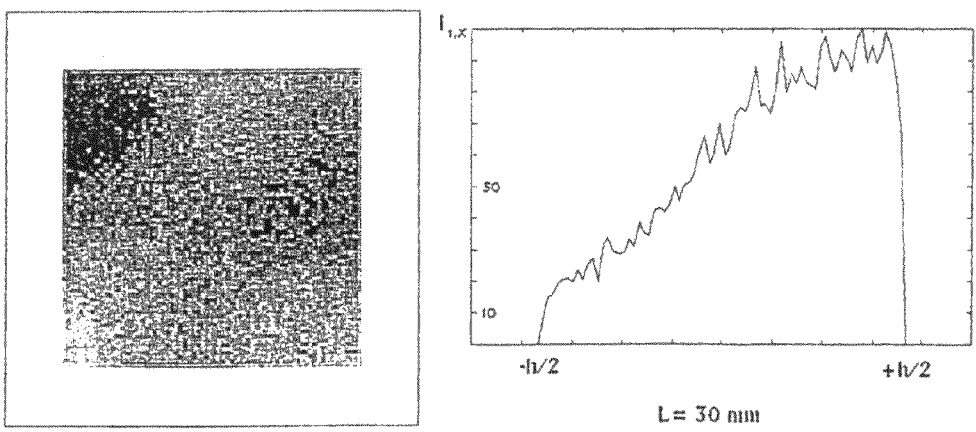
Figure 9:
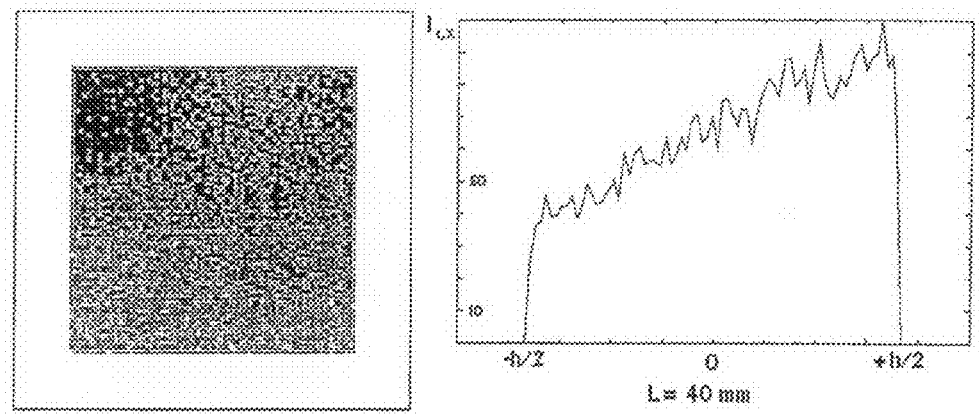
Figure 10:
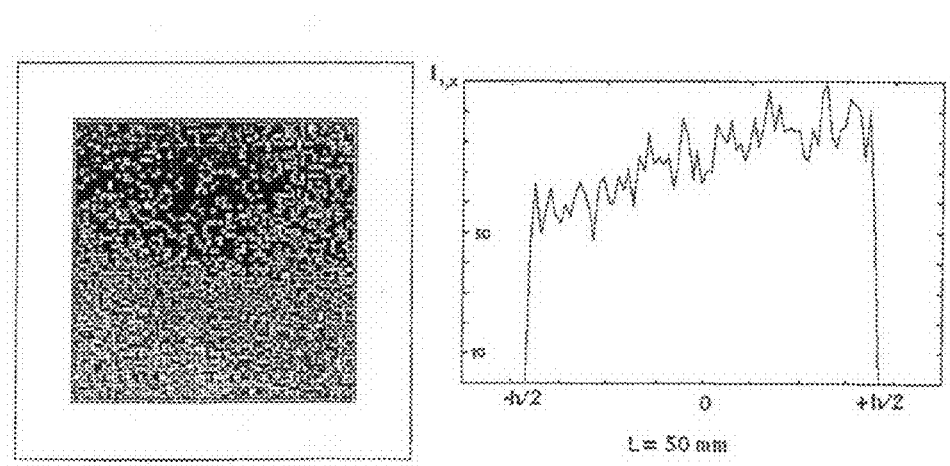
Figure 11:
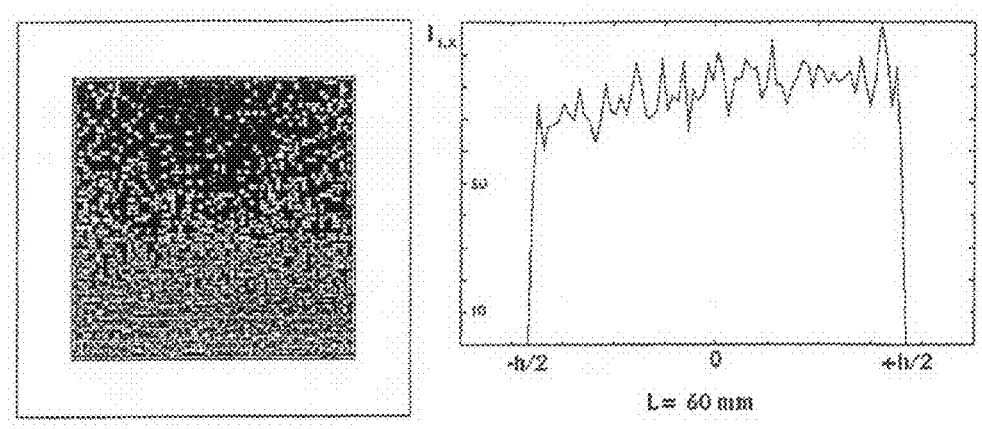

By way of a non-limiting example of the invention, tests have been carried out with a device 1 for producing light displaying the following main characteristic features:

wave guide 11 of transparent Plexiglas;

the entrance 110 and exit 111 surfaces of the wave guide form a square of approximately 50 mm on each side;

the diodes 101 (R, V, B) are distributed according to the arrangement shown in FIG. 2, with a space x between two adjacent diodes along the axis X equating to 16 mm, and a space y between two adjacent diodes along the axis Y equating to 10 mm;

the diodes 101 are positioned against the entrance surface 110 of the wave guide 11;

the emission spectra of the diodes 101 (R, V, B) used are shown on FIG. 4.

Different tests have been carried out with wave guides of different lengths L and by switching on only the green diodes 101 (V), the other blue and red diodes of the device 1 remaining switched off.

For each test, use is made of a flat collector (for instance a CCD matrix), which is positioned at the exit of the wave guide 11, at the right of the exit surface 111 and in a plane perpendicular to the propagating axis Z of the wave guide 11. This collector covers at least the entire section of the exit of the wave guide 11 (area of the exit surface 111 of the wave guide 11). This collector enables the intensity to be measured in the plane (X, Y) of the light produced at the exit of the device 1, in this instance by means of the green light source ($S_1$) over the entire section of the exit of the wave guide 11. The CCD matrix should preferably display a resolution that is sufficient for enabling at least 100 points to be measured over the entire section of the exit of the wave guide 11 and along a predefined axis (axis X in the examples below); the precision of the measurement should be at least 1% of the power of the measurement point with the highest power. Instead of a CCD matrix, a punctual detector can also be used with the size of one measurement point, the measurement being carried out by moving this punctual detector over the entire section of the exit of the guide 11 along the predefined measurement axis (axis X in the examples below).

FIGS. 5 to 11 show the measurement results for different lengths L of the wave guides 11, i.e.: L=0 (no wave guide); L=10 mm, L=20 mm; L=30 mm; L=40 mm; L=50 mm; L=60 mm.

On each of FIGS. 5 to 11, the view from the left shows the spatial distribution in X and Y of the light intensities revealed by means of the collector, and the view from the right is a curve of the light intensity levels $I_{1,x}$ revealed along the transverse axis X, for a given position along axis Y (in this instance on the vertical left edge of the wave guide 11), and along a range of measurements corresponding to the height (h) of the exit section of the wave guide 11. With reference to FIG. 1, this height (h) corresponds to the section of the exit of the wave guide 11 along the axis (X). Along the axis of the abscissas of FIGS. 5 to 11, reference number 0 corresponds to the position along X of the central axis of symmetry 11a of the guide 11.

It follows from FIGS. 5 to 11 that the more the length L of the wave guide 11 increases, the more the uniformity of the spatial distribution of the light intensity is improved.

Figure 12:
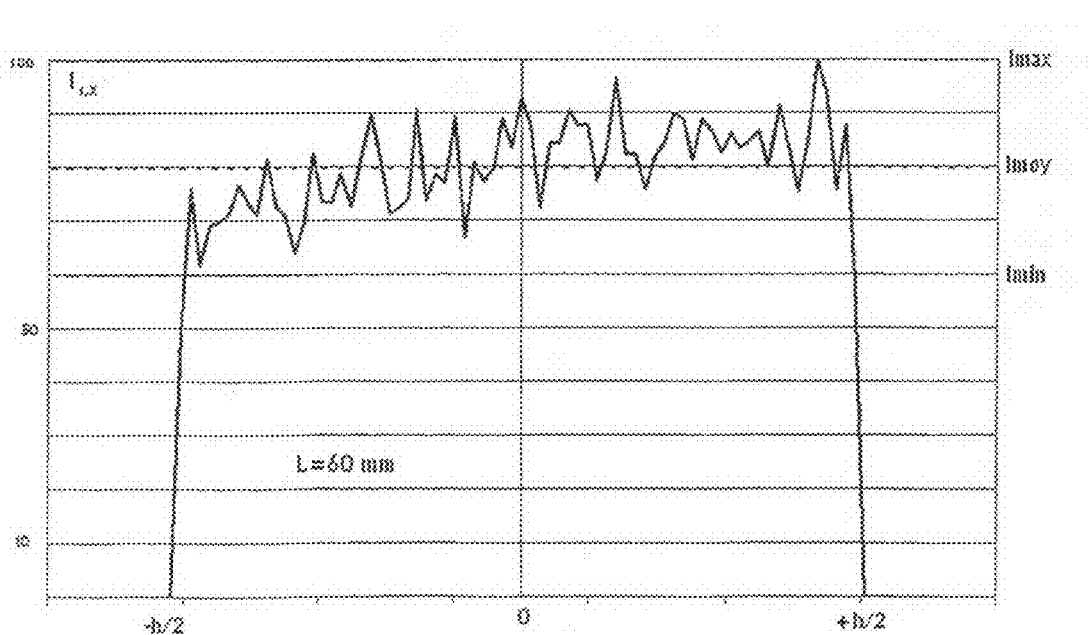

FIG. 12 shows the profile of the light intensity $I_{1,x}$ obtained with a wave guide 11 of a length L measuring 60 mm, and on this FIG. 12 three horizontal straight lines have been added (dotted lines) corresponding in each case to the maximum intensity (Imax) measured along the axis X, to the minimum intensity (Imin) measured along axis X and to the average intensity (Imoy) measured along X.

In accordance with the invention, for this length L measuring 60 mm, the light intensity $I_1$, x for the source $S_1$ (green diodes V) is comprised in a bracket of 30% around the average value Imoy [i.e.: ((Imax−Imoy)≦0.3.Imoy) and ((Imoy−Imin)≦0.3Imoy)]. The distribution of the light intensity at the exit of the wave guide 11 is thus quasi-uniform.

More precisely, with reference to FIG. 12, on a scale from 0 to 100, the maximum intensity Imax equates to 100, the minimum intensity Imin equates to 62 and the average intensity equates to 80. In this preferred embodiment, the following is obtained: (Imax−Imoy)=0.25.Imoy and (Imoy−Imin)−0.225Imoy.

Figure 13:
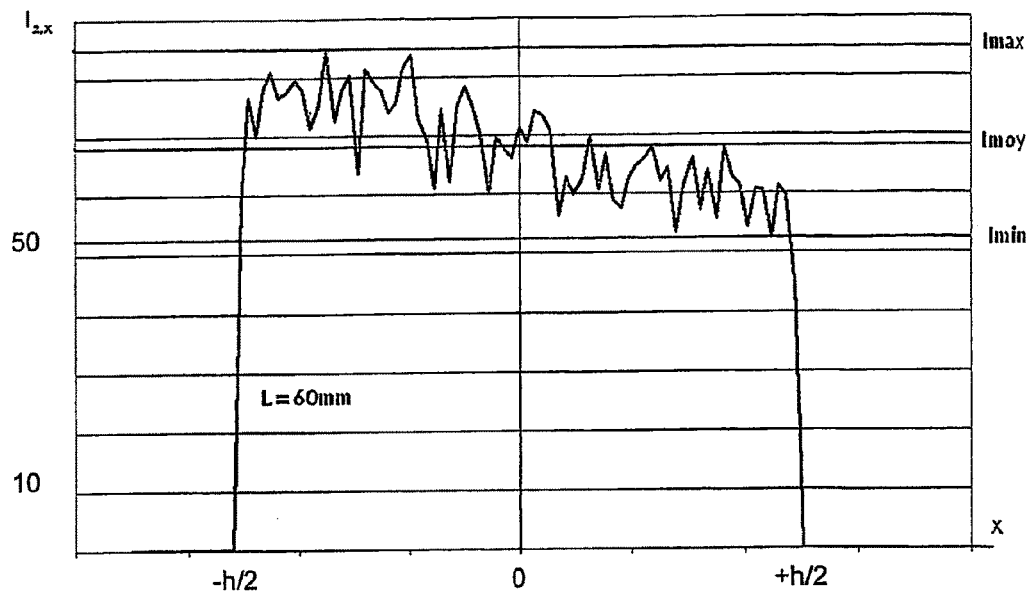
Figure 14:
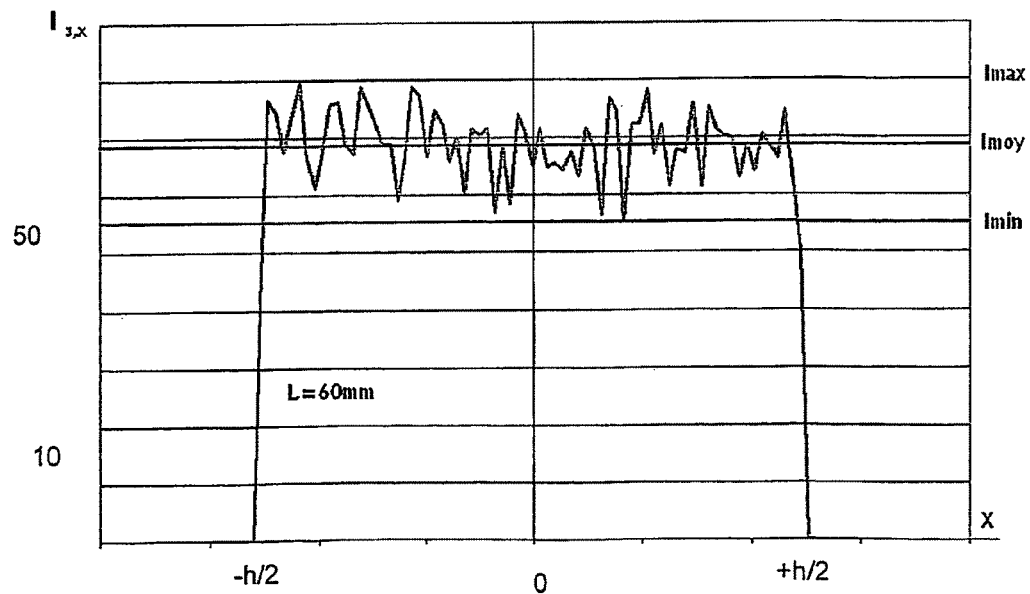

The same measurements have been carried out with a wave guide 11 of a length L measuring 60 mm, and separately for each of the two other sources $S_2$ (blue-colour diodes) and $S_3$ (red-colour diodes). The results of the measurements (profile $I_{2,x}$ of the light intensity along axis X) for the source $S_2$ (blue-colour diodes) are shown in FIG. 13; the results of the measurements (profile $I_{3,x}$ of the light intensity along axis X) for the source $S_3$ (red-colour diodes) are shown in FIG. 14.

For each of the other sources $S_2$ and $S_3$, with a wave guide of a length L measuring 60 mm, the light intensity levels $I_{2,x}$ (blue diodes) and $I_{3,x}$ (red diodes) are comprised within a bracket of 30% around the average value Imoy. For each of the other sources $S_2$ and $S_3$, the distribution of the light intensity at the exit of the wave guide 11 is thus quasi-uniform. The result is that the colour of the light produced at the exit of the wave guide 11 is, according to the invention, quasi-uniform in each point in the space.

This limit value of 30% around the average value Imoy, which defines the spatial quasi-uniformity of the colour in the sense of the invention is linked in practice to the sensitivity of the human eye. Beyond this limit, the human eye is considered to be susceptible of detecting variations of colour in the space that are not acceptable in terms of quality of the light produced. Thus, compared with the above-cited examples, with wave guides 11 of a length L inferior or equal to 50 mm, the distribution of the light intensity $I_{1,x}$ at the exit of the wave guide 11 for the source $S_1$ is not quasi-uniform ((Imax−Imoy)>0.3.Imoy) and ((Imoy−Imin)>0.3.Imoy), and the devices concerned thus do not comply with the invention. By contrast, for the wave guide 11 of a length L measuring 50 mm and for the green-colour diodes (FIG. 10), on a scale from 0 to 100, the maximum intensity Imax equates to 100, the minimum intensity Imin equates to 47 and the average intensity equates to 76. In this example, the following is obtained: (Imax−Imoy)=0.315.Imoy and (Imoy−Imin)=0.38Imoy. This is outside of the above-cited bracket of 30% defining the quasi-uniformity in the sense of the invention.

In the above-cited measurement results, the profile of the light intensity levels $I_{i,x}$ along axis X is shown. To qualify the quasi-uniformity, in the sense of the invention, of the colour of the produced light, the same measurements can be equally carried out along any axis of the plane (X, Y) over the entire section of the exit of the wave guide 11 along this axis.

The length L of the wave guide 11 is an important parameter influencing the spatial uniformity of the light intensity of the light produced at the exit of the device 1, but it is not the only parameter. Parameters such as in particular the spatial distribution of the diodes 101 of the light sources $S_1$, $S_2$, $S_3$, the emission angle of the diodes 101, the distance between the light sources $S_1$, $S_2$, $S_3$ and the entrance surface 110 of the wave guide 11 also influence the spatial uniformity of the light intensity.

In addition, the more the transverse section of the wave guide displays a significant dimension, the more the number of propagation modes of the light increases and, as a result, the more the length L of the wave guide must be significant to obtain the desired result of quasi-uniformity of the light intensity levels.

It is thus up to the person skilled in the art to adapt on a case-by-case basis the length L of the wave guide 11 so as to obtain at the exit of the wave guide 11a quasi-uniform spatial distribution of the light by adopting the criterion of quasi-uniformity defined previously (maximum tolerance of 30% around the average value Imoy for each light source).

Scattering Module (12)

The scattering module 12 (FIG. 1) at the exit of the wave guide 11 enables the light to be diffused at the exit of the wave guide 11, in all directions over 180°. At the exit of the light-producing device 12, at each point in space, the light is completely mixed in all directions and cannot be decomposed any further, for instance by using a prism.

To obtain a device for producing isotropic light with a total emission angle of 180°, the scattering module 12 displays a scattering angle β complementary to the emission angle α of the diodes 101.

By means of illustration, if the diodes 101 display a total emission angle α of 60°, the total scattering angle β of the module 12 must be 120° to obtain a source emitting over 180° at the exit of this scattering module.

Preferably, the use of punctual sources 101 is favoured, displaying a significant emission angle α, i.e. superior or equal to 60°, leading to the use of a scattering module 12 displaying a scattering angle β inferior or equal to 120°.

It is in general preferable to use punctual sources displaying a significant emission angle α, since this enables the light output of the device of the invention to be improved:
  on the one hand by reducing the length of the wave guide 11,
  on the other hand by enabling the use of a scattering module 12 displaying a reduced scattering angle β (α=180°−α).

The implementation of a scattering module displaying a reduced scattering angle β indeed advantageously enables the backscattering to be limited, on the one hand, and the energy losses through absorption to be limited, on the other hand.

The scattering module 12 (regardless of which embodiment) preferably displays a reduced thickness in order not to degrade the light output too much.

The scattering module 12 is preferably chosen so that the global light output ρ of the wave guide 11/scattering module 12 ensemble is superior to 60% and preferably superior to 70%.

The scattering module 12 is for instance a plate of reduced thickness displaying numerous structural irregularities. At the exit of the wave guide 11, the coloured light passes through the scattering plate 12 and undergoes multiple deviations (scattering) owing to the presence of the irregularities in the structure of the plate 12. This scattering plate can be replaced by any equivalent scattering element fulfilling the same light scattering function.

For instance, the plate 12 can be replaced by an appropriate treatment of the exit surface 111 of the wave guide 11, conferring upon this exit surface 111a rough or equivalent (for instance sanded) surface.

The scattering module 12 is for instance a scattering module of the holographic type, of which the total divergent angle of the light beam can be chosen between 1° and 160°. This type of scattering module also has the advantage of having a transmission superior to 85%.

The scattering module 12 is for instance a standard scattering module constituted by a glass plate of which at least one of the two surfaces has been sanded in order to give it a roughness enabling the required divergence of the light beams to be obtained.

The scattering module 12 can also be a tinted glass in which the scattering is obtained by incorporating scattering elements inside the glass (barium sulphate for instance).

Preferably, the scattering should be in all directions, with as low as possible a loss in light intensity.

Second Embodiment of Wave Guide (Mirrors)

Figure 15:
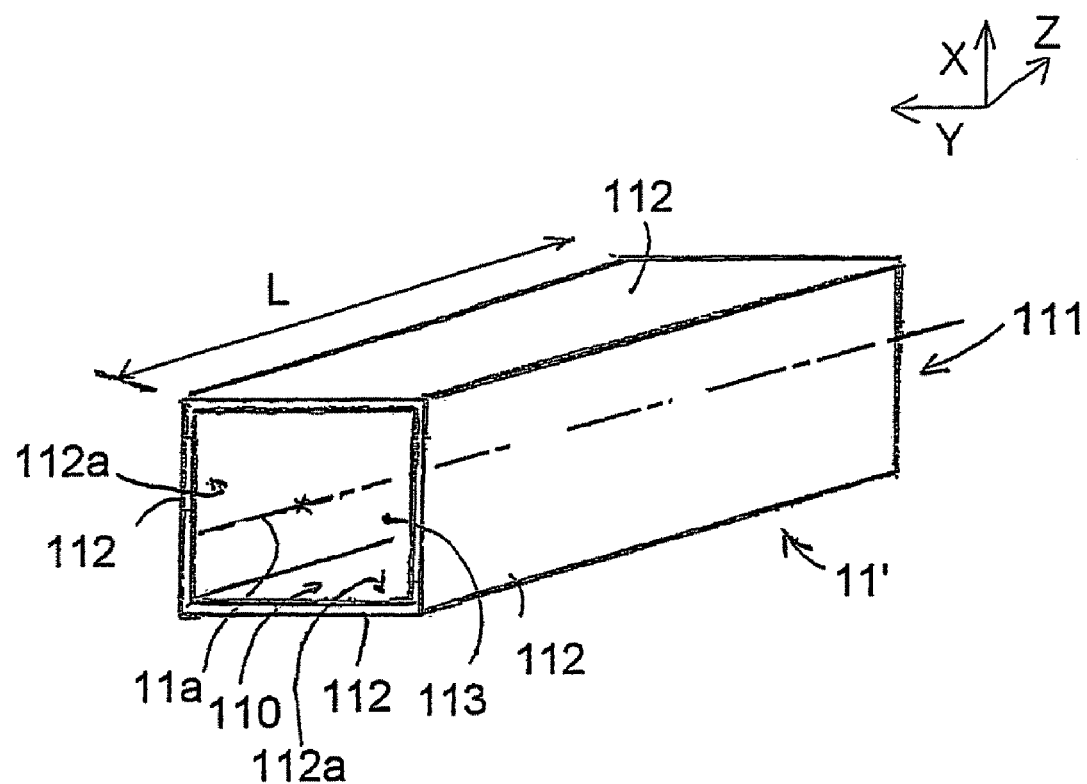
FIG. 15 shows a perspective view of a further embodiment of a wave guide.

In a further embodiment, the wave guide 11 of FIG. 1 is replaced by the guide 11' of FIG. 15. This guide 11' is constituted by four walls 112, which are orientated parallel to the propagation direction (Z) of the guide and which between them define an internal cavity 113 displaying a central axis of symmetry 11a and enabling the light to be propagated. The internal surfaces 112a of the walls 112 constitute reflecting mirrors enabling the light to be propagated in the cavity 113 by total reflections in the direction (Z).

For the guide 11' of FIG. 15, the length L of the guide is adapted by applying the same method as that given previously for the length L of the guide 11 of FIG. 1, so as to obtain the result of quasi-uniformity of the light intensity levels at the exit of the wave guide.

In this embodiment of FIG. 15, as well as in the embodiment of FIG. 1, the transverse cross-section of the wave guide is rectangular. This is not a limiting factor of the invention. In other embodiments, the wave guide can have a different cross-section and can more generally form a polygon or a circle.

The invention claimed is:

1. A device for producing isotropic ambient light, characterised in that it includes at least one extended light source, which comprises several punctual light sources spaced apart along two orthogonal axes, a wave guide, which enables light beams produced by the punctual light sources to be propagated, by total reflections and in a propagation direction perpendicular to a plane, and a means for scattering the light at an exit of the wave guide, and in that a dimension of the wave guide along said propagation direction is sufficient for a light intensity curve which is detected for each light source at the exit of the wave guide along one of the two axes and in a detection range corresponding to a section of the exit of the wave guide along said one of the two axes, to display a maximum value (Imax) and a minimum value (Imin), with respect to the following criterion of quasi-uniformity: (Imax-Imoy) $\leq$0.3 Imoy and (Imoy-Imin) $\leq$0.3 Imoy, Imoy being an average value of the light intensity levels detected along said one of the two axes.

2. The device according to claim 1, wherein the light intensity curve that is detected for each light source displays a maximum value (Imax) and a minimum value (Imin), with respect to the following criterion of quasi-uniformity:

(Imax-Imoy) $\leq$0.25 Imoy and (Imoy-Imin) $\leq$0.25 Imoy.

3. The device according to claim 1, wherein the scattering means displays a scattering angle complementary to an emission angle of the punctual light sources, such that the light at the exit of the scattering means is emitted over 180°.

4. The device according to claim 1, wherein an emission angle of the punctual light sources is greater than or equal to 60°.

5. The device according to claim 1, wherein a global light output of the wave guide/scattering means ensemble is greater than 60% and preferably greater than 70%.

6. The device according to claim 1, wherein a light output of the wave guide is greater than 70%.

7. The device according to claim 6, wherein a light output of the wave guide is greater than 80%.

8. The device according to claim 1, wherein the light intensity of at least one light source, and preferably of each light source, is adjustable.

9. The device according to claim 1, wherein it includes at least two light sources, each displaying different ranges of emission wave lengths.

10. The device according to claim 9, wherein it includes at least three light sources, each displaying different ranges of emission wave lengths, which can overlap or not.

11. The device according to claim 10, wherein it includes three different light sources, a first light source being designed to emit along a range of wave lengths comprised between 450 nm and 600 nm, a second light source being designed to emit along a range of wave lengths comprised between 400 nm and 500 nm, and a third light source being designed to emit along a range of wave lengths comprised between 600 nm and 700 nm.

12. The device according to claim 1, wherein each light source includes a plurality of electroluminescent diodes.

13. The device according to claim 1, wherein the wave guide includes at least one solid transparent body.

14. The device according to claim 13, wherein the solid body is made out of polymer or glass.

15. The device according to claim 1, wherein the wave guide includes walls, which are orientated parallel to the propagation direction of the guide, having internal surfaces of which are reflecting mirrors, and which define between them an internal cavity for propagating the light.

* * * * *

UNITED STATES PATENT AND TRADEMARK OFFICE
CERTIFICATE OF CORRECTION

| | | |
|---|---|---|
| PATENT NO. | : 8,011,800 B2 | Page 1 of 1 |
| APPLICATION NO. | : 12/225406 | |
| DATED | : September 6, 2011 | |
| INVENTOR(S) | : Jaouad Zemmouri | |

It is certified that error appears in the above-identified patent and that said Letters Patent is hereby corrected as shown below:

Column 6, line 50, "0.3Imoy)]." should be --0.3.Imoy)].--.

Column 6, line 57, "0.225Imoy." should be --0.225.Imoy.--.

Column 7, line 25, "0.38Imoy." should be --0.38.Imoy.--.

Column 7, line 51, "11a" should be --11 a--.

Column 8, line 13, "($\alpha = 180° - \alpha$)" should be --($\beta = 180° - \alpha$)--.

Column 8, line 23, "$\rho$" should be --$\rho'$--.

Column 8, line 36, "111a" should be --111 a--.

Signed and Sealed this
Twenty-fifth Day of October, 2011

David J. Kappos
*Director of the United States Patent and Trademark Office*